United States Patent [19]

Borrow

[11] Patent Number: 4,509,863

[45] Date of Patent: Apr. 9, 1985

[54] APPARATUS FOR MIXING MILK WITH FLAVORING AND FLUORIDE

[76] Inventor: Edgar W. Borrow, Padnell Grange, Cowplain, Portsmouth, Hampshire, England

[21] Appl. No.: 623,937

[22] Filed: Jun. 25, 1984

[30] Foreign Application Priority Data

Jun. 23, 1983 [GB] United Kingdom ............. 8317059

[51] Int. Cl.³ ............... G05D 11/00; B01F 15/04
[52] U.S. Cl. .................. 366/162; 222/453; 366/132; 366/152
[58] Field of Search ......... 366/162, 160, 151, 152, 366/131, 132, 19; 222/132, 145, 453

[56] References Cited

U.S. PATENT DOCUMENTS

| | | | |
|---|---|---|---|
| 2,198,524 | 4/1940 | Berwick | 366/160 |
| 3,178,157 | 4/1965 | Cole | 366/151 |
| 4,090,262 | 5/1978 | Schneider | 366/162 |
| 4,132,483 | 1/1979 | Slaats | 366/162 |

FOREIGN PATENT DOCUMENTS 781818 8/1957 United Kingdom ............... 366/162

Primary Examiner—Robert W. Jenkins
Attorney, Agent, or Firm—Leydig, Voit, Osann, Mayer & Holt, Ltd.

[57] ABSTRACT

Apparatus for mixing together milk, a fluoride solution and a flavoring solution to produce a pleasant-tasting fluoridated beverage, comprises two sets each of three vessels for containing the respective liquids to be mixed. The volumes of the three vessels are in the proportions in which the liquids are to be mixed and inlet flows from supply tanks of the three liquids are metered to fill the three vessels simultaneously. A common inlet valve shuts off the three supplies simultaneously and operation of the inlet valve automatically opens the outlet and mixing valve. As one set of vessels is filled, the other is emptied to provide a substantially continuous flow of the beverage.

8 Claims, 2 Drawing Figures

4,509,863

APPARATUS FOR MIXING MILK WITH FLAVORING AND FLUORIDE

BACKGROUND OF THE INVENTION

1. Field of the Invention

This invention relates to beverage mixing and/or dispensing apparatus and more particularly to apparatus for producing a beverage containing milk, a flavouring, and a trace amount of a suitable fluoride.

2. Summary of the Prior Art

In view of the widespread resistance to the artificial fluoridation of drinking water, it has been suggested that fluoride for the reduction of dental decay could be supplied to children by means of beverages provided at school or sold for general consumption. In order however to fluoridate such beverages in a simple and economic manner, it is desirable to fluoridate the beverage before it is packaged for distribution.

From British Patent Specification No. 1,446,355 it is known to provide apparatus for mixing together milk, a fluoride solution and a flavouring solution in a predetermined volume ratio to provide a fluoridated beverage, which comprises a set of three vessels whose internal volumes are in the same ratio as the volume ratio of the three liquid components of the beverage, and outlet valve means operable to permit the three liquids to flow out of the three vessels simultaneously and to mix together.

This known apparatus adequately mixes the three liquid constituents of the beverage, but suffers from the disadvantage that the supply of the beverage has to be interrupted when the vessels need replenishing. It is an object of the present invention to overcome this disadvantage.

SUMMARY OF THE INVENTION

According to the present invention there is provided apparatus for mixing together milk, a fluoride solution and a flavouring solution in a predetermined volume ratio to provide a fluoridated beverage, which comprises a first set of three at least translucent vessels whose internal volumes are in the same ratio as the volume ratio of the three liquid components of the final beverage, having outlet valve means of each vessel operable to permit the three liquids to flow out of the three vessels simultaneously and to mix together, inlet valve means operable simultaneously to shut off the flow of the three liquids into the vessels, and means coupling the outlet valve means and the inlet valve means which enables closure of the inlet valve means to permit outflow through the outlet valve means, a second set of three at least translucent vessels substantially identical to those of the first set and having inlet valve means, operable simultaneously to shut off the flow of the three liquids, into the vessels of the second set, outlet valve means which permit the vessels of the second set to be filled as the vessels of the first set are emptied and vice-versa, thus providing a substantially continuous supply of the beverage and means coupling the outlet valve means of the second set and the inlet valve means of the second set which enables closure of the inlet valve means to permit outflow through the outlet valve means, the at least translucent vessels enabling an operator to check that the vessels are filled to a selected common level before the contents are discharged.

The inlet valve means for each set of vessels allows an automatic, metered supply of the three liquids to be used; while one set is being replenished through an inlet valve means, the other set is automatically allowed by the outlet valve means to drain.

This apparatus hereinafter particularly described provides an automatic and continuous supply of beverage; the inlet and outlet valves for each set of vessels are linked so that when one closes the other opens, and the provision of two sets of vessels working in parallel but "out of phase" allows a substantially continuous supply to be taken at a common outlet, provided only that each set takes no longer to fill than it takes to drain. The visibility of the level of contents of each vessel of a set is advantageous since it shows an operator how and when to adjust the relative speeds of flow of the liquids supplied to the inlet valve means.

DESCRIPTION OF THE PREFERRED EMBODIMENT

Figure 1:
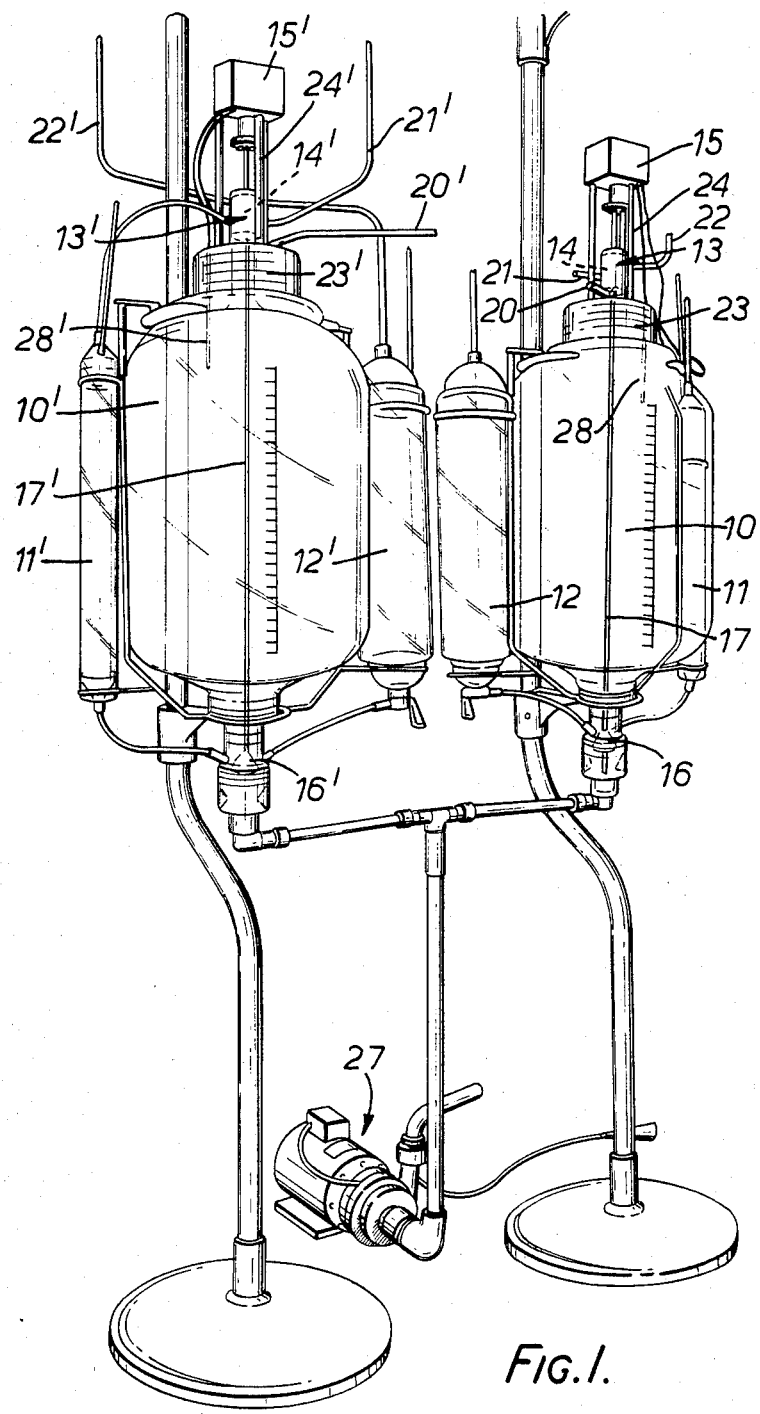
FIG. 1 is a perspective view of apparatus in accordance with the invention showing two sets of parts each comprising three vessels for containing the three liquids to be mixed, an inlet control valve for controlling the filling of the vessels and an outlet control valve for the mixing of the liquids.
Figure 2:
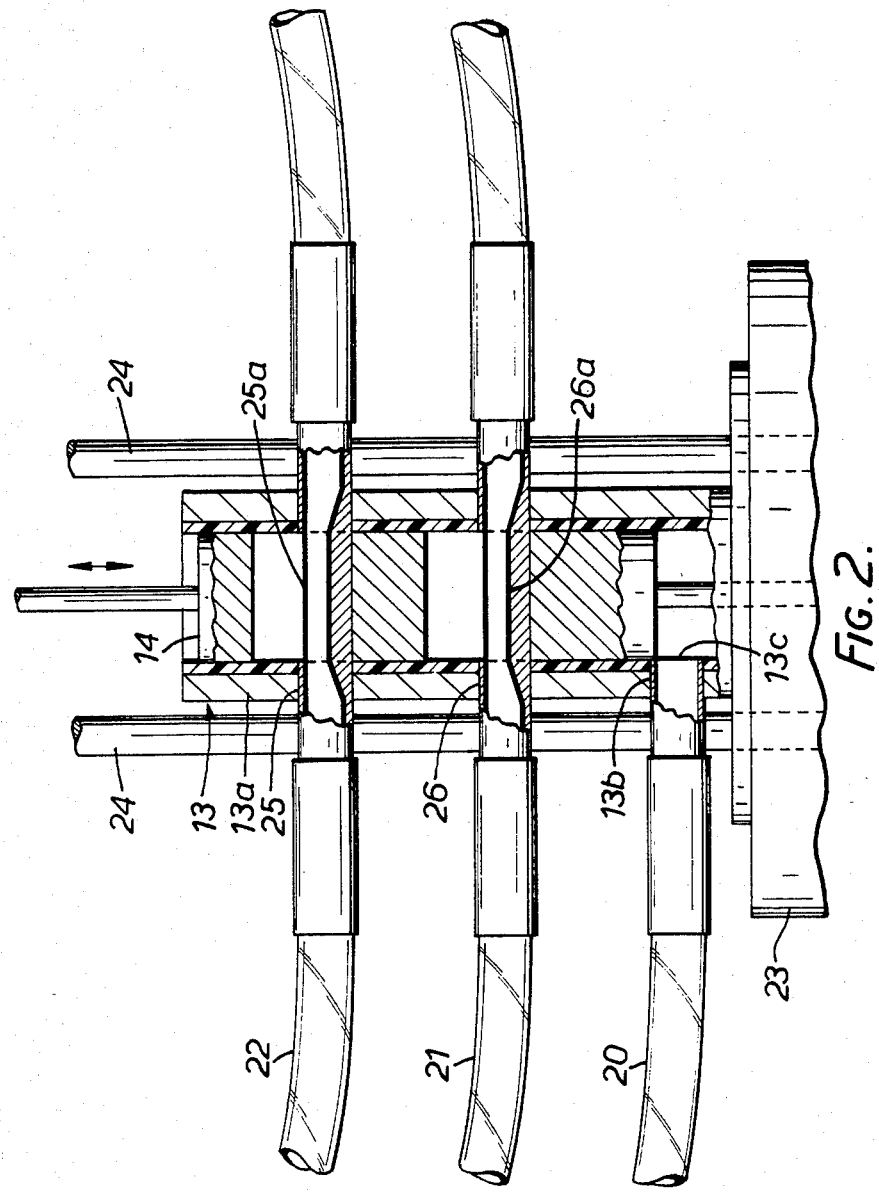
FIG. 2 is a section, on a larger scale, through the inlet control valve.

As shown in FIG. 1 the apparatus comprises two identical sets of transparent glass vessels, one set comprising a milk container 10, a fluoride solution container 11 and a flavour solution container 12, and an inlet slide valve 13 having a valve member 14 and controlled by an operating solenoid 15, and an outlet valve 16 connected by a rod 17 to the valve member 14 for movement in unison therewith. The three vessels of each set are of upright cylindrical shape and their internal volumes are in the same ratio as the volumes of the liquids in the final beverage.

Supply lines 20,21,22 of clear plastics or other flexible tubular material, lead respectively from supplies of milk, fluoride and flavouring solutions to the respective containers 10,11,12 via the inlet valve.

Liquids flow through these supply lines, preferably under the force of gravity but possibly under pressure and metering valves (not shown) control the rate of flow in each supply line, so that the containers are filled simultaneously.

The inlet valve 13 is mounted on a cap 23 of the milk container 10, and the solenoid 15 is supported above the cap by support posts 24.

In the inlet valve 13, the cylindrical valve housing 13a supports two metal tubes 25,26 each passing diametrically through the housing and through the valve member 14 at axially spaced positions. These tubes are connected at their opposite ends to the supply lines 22,21 respectively to lead the liquid supplies through the housing and the valve member. Each metal tube is cut away over the length thereof which extends within the valve member, and each tube is provided with a tubular rubber liner 25a,26a which is thus exposed to contact with the valve member. This length of each metal tube within the housing 13a is preferably formed with an upwardly facing flat surface which provides a platform on which the exposed length of rubber liner rests. Thus, in operation, when the valve member 14 moves axially it will compress the exposed length of rubber liner and shut off the liquid supply, without the valve member coming into contact with the liquid. The movement of the valve member to achieve cut off is about ⅜ inch (or 0.95 cm.).

The supply line 20 for the milk could be opened or closed in the same way, but in the illustrated embodiment, the line 20 communicates with an inlet pipe 13b connected to a port 13c in the valve housing 13a which is directly opened or closed by movement of the valve member, the discharged milk being free to flow directly into the container 10.

In this way, the supply lines 20,21 and 22 can readily be detached from the valve for cleaning and the rubber liners can be replaced daily without disassembling the apparatus.

The parts of the second set are identical to those of the first set and are therefore indicated by the same reference numerals but with a prime (for example 10′). The outlets of the two outlet valves 16,16′ are connected together to an outlet pump 27 which discharges the mixed liquids to a packaging station (not shown).

In order to allow free movement of liquids into and out of each container, the containers are provided with air vents.

The metal parts of the apparatus which come into contact with liquids are preferably of stainless steel.

The apparatus is controlled by an electric control circuit which forms no part of the invention but is connected to respective liquid-level sensing probes 28,28′ in the milk containers 10,10′. Thus in operation of the apparatus, upon initiation by a start switch, the solenoid 15 is energised to lift the inlet valve member 14 of the first set against the force of a closure spring (not shown) to open each of the supply lines 20,21,22 and allow a metered flow of the respective liquids to enter the containers 10,11,12 respectively. When the level of milk in container 10 reaches the probe, the control circuit de-energises the solenoid 15. The valve member 14 is thus lowered under the force of the closure spring to close the supply lines 20,21,22 and open the outlet valve to permit the contents of the three containers 10,11,12 to flow out and mix together. This flow is assisted by the pump 27.

At the same time as the inlet valve 13 is closed, or by operation of a timing circuit, the inlet valve 13′ of the second set is opened to commence filling the containers 10′,11′,12′ of the second set. The rates of flow will be so controlled that the containers 10,11,12 will have discharged their contents before the discharge of the containers of the second set is initiated.

It will be appreciated that since the vessels are made of transparent glass, or at least are provided with windows through which the level of liquid in each vessel is visible, and since the internal volumes of the three vessels correspond to the volume ratio in which the three liquids are to be mixed, the liquids in the three vessels will maintain a common liquid level as the liquids flow into the vessels if the metering valves controlling the flown are correctly set. If the level in one vessel is above or below the level in the others, the flow rate into that vessel can be reduced or increased to correct the misalignment and ensure that when the inlet valve closes, all three vessels are filled to the same level. In this way a precise volume ratio of the liquids in the beverage is ensured.

Conveniently the fluoride solution containers 11,11′ have a capacity of about 100th that of the milk containers 10,10′. In this case, the fluoride/water solution will have a concentration of about 450 parts per million so that the concentration of the fluoride in the mixed beverage will be about 4.5 parts per million.

I claim:

1. Apparatus for mixing together milk, a fluoride solution and a flavouring solution in a predetermined volume ratio to provide a fluoridated beverage, which comprises
   a first set of three at least translucent vessels whose internal volumes are in the same ratio as the volume ratio of the three liquid components of the final beverage, having
      outlet valve means of each vessel operable to permit the three liquids to flow out of the three vessels simultaneously and to mix together,
      inlet valve means operable simultaneously to shut off the flow of the three liquids into the vessels, and
      means coupling the outlet valve means and the inlet valve means, which enables closure of the inlet valve means to permit outflow through the outlet valve means,
   a second set of three at least translucent vessels substantially identical to those of the first set and having
      inlet valve means, operable simultaneously to shut off the flow of the three liquids into the vessels of the second set,
      outlet valve means which permit the vessels of the second set to be filled as the vessels of the first set are emptied and vice-versa, thus providing a substantially continuous supply of the beverage
      and means coupling the outlet valve means of the second set and the inlet valve means of the second set which enables closure of the inlet valve means to permit outflow through the outlet valve means,
   the at least translucent vessels enabling an operator to check that the vessels are filled to a selected common level before the contents are discharged.

2. Apparatus according to claim 1, wherein each inlet valve means comprises a valve having a housing, three supply pipes connecting the housing to metered sources of the three liquids and a valve member movable in said housing to start or stop simultaneously the fluid flow through the three pipes.

3. Apparatus according to claim 2, wherein each outlet valve means comprises an outlet valve communicating with outlets of the vessels and having a single valve member movable to start or stop simultaneously the fluid flow from the three vessels.

4. Apparatus according to claim 3 wherein the said coupling means connects the valve member of each inlet valve means to the valve member of the corresponding outlet valve whereby to cause one of said valves to open as the other closes, and vice versa.

5. Apparatus according to claim 2, wherein said valve member has at least one aperture extending therethrough transverse to its direction of movement, and a flexible pipe portion located in the or each said aperture communicating with the or each corresponding supply pipe so that as the valve member moves towards the valve-closed position, it deforms said flexible pipe portion or portions to shut off fluid flow through said pipe or pipes.

6. Apparatus according to claim 5, wherein said flexible pipe portion is supported in a rigid pipe which is cut-away over the portion of the pipe to be deformed by the valve member.

7. Apparatus according to claim 6, wherein said rigid pipe has a flat surface which provides a platform on which said flexible pipe portion rests.

8. Apparatus according to claim 5, wherein each said valve member has two of the said flexible pipe portions within its housing connected in corresponding liquid supply lines to corresponding said vessels remote from the inlet valve means, and each inlet valve has a port connecting the third liquid supply line to the third vessel which is situated below the inlet valve, the valve member opening and closing the port and the said two flexible pipe portions simultaneously.

9. Apparatus according to claim 1, comprising a sensor for each vessel sensing that the milk in the associated vessel has reached a predetermined level, the sensor being coupled to the inlet valve means to operate the latter.

* * * * *